(12) United States Patent
Hiroki

(10) Patent No.: US 8,386,683 B2
(45) Date of Patent: Feb. 26, 2013

(54) INFORMATION PROCESSING APPARATUS, INTERRUPT CONTROL DEVICE AND INTERRUPT CONTROL METHOD

(75) Inventor: Masahide Hiroki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/894,959

(22) Filed: Sep. 30, 2010

(65) Prior Publication Data

US 2011/0016246 A1    Jan. 20, 2011

Related U.S. Application Data

(63) Continuation of application No. PCT/JP2008/056377, filed on Mar. 31, 2008.

(51) Int. Cl.
*G06F 13/24* (2006.01)

(52) U.S. Cl. ............ 710/262; 710/263; 710/266

(58) Field of Classification Search .......... 710/262
See application file for complete search history.

(56) References Cited

U.S. PATENT DOCUMENTS

| | | | | |
|---|---|---|---|---|
| 5,542,076 A | * | 7/1996 | Benson et al. | 710/260 |
| 5,659,758 A | * | 8/1997 | Gentry et al. | 710/260 |
| 5,905,913 A | * | 5/1999 | Garrett et al. | 710/49 |
| 5,943,479 A | * | 8/1999 | Klein et al. | 709/212 |
| 6,195,725 B1 | * | 2/2001 | Luhmann | 710/266 |
| 6,351,785 B1 | * | 2/2002 | Chen et al. | 710/263 |
| 6,615,305 B1 | * | 9/2003 | Olesen et al. | 710/262 |
| 6,988,156 B2 | * | 1/2006 | Musumeci | 710/260 |
| 7,054,972 B2 | * | 5/2006 | Parry et al. | 710/260 |
| 7,065,598 B2 | * | 6/2006 | Connor et al. | 710/260 |
| 7,120,717 B2 | * | 10/2006 | Vu | 710/262 |
| 7,634,589 B2 | * | 12/2009 | Anand et al. | 710/15 |
| 8,112,555 B2 | * | 2/2012 | Anand et al. | 710/15 |
| 2002/0004889 A1 | | 1/2002 | Honma et al. | |
| 2004/0123008 A1 | * | 6/2004 | Connor et al. | 710/260 |
| 2004/0236875 A1 | | 11/2004 | Jinzaki | |
| 2005/0182879 A1 | * | 8/2005 | Vu | 710/260 |
| 2006/0064520 A1 | * | 3/2006 | Anand et al. | 710/52 |
| 2006/0064529 A1 | * | 3/2006 | Anand et al. | 710/260 |
| 2010/0274938 A1 | * | 10/2010 | Anand et al. | 710/263 |
| 2010/0274940 A1 | * | 10/2010 | Ahmad et al. | 710/267 |
| 2012/0124254 A1 | * | 5/2012 | Anand et al. | 710/52 |

FOREIGN PATENT DOCUMENTS

| | | |
|---|---|---|
| JP | 52-47648 | 4/1977 |
| JP | 53-145536 | 12/1978 |
| JP | 11-15800 | 1/1999 |
| JP | 2001-14243 | 1/2001 |
| JP | 2002-23961 | 1/2002 |
| JP | 2004-15497 | 1/2004 |
| JP | 2007-199887 | 8/2007 |
| WO | 03/063002 A1 | 7/2003 |

OTHER PUBLICATIONS

International Preliminary Report on Patentability, mailed Dec. 23, 2010, in corresponding International Application No. PCT/JP2008/056377 (6 pp.).
International Search Report for PCT/JP2008/056377, mailed Jun. 3, 2008.
Japanese Office Action mailed May 22, 2012 issued in corresponding Japanese Patent Application No. 2010-505174.

* cited by examiner

Primary Examiner — Ryan Stiglic
(74) Attorney, Agent, or Firm — Staas & Halsey LLP

(57) ABSTRACT

An information processing device in which interrupts are generated when some events are occurred. The information processing device includes: an interrupt generating unit to generate an interrupt; an interrupt control unit to receive the generated interrupt, count an interrupt reception count per unit time, notify of the interrupt and delay, if the counted interrupt reception count per unit time exceeds a predetermined value, the interrupt notification; and an interrupt processing unit to process the notified interrupt.

3 Claims, 18 Drawing Sheets

FIG. 9

| # mpstat 1 | | | | | | | | | | | | | | | |
|---|---|---|---|---|---|---|---|---|---|---|---|---|---|---|---|
| CPU | minif | mjf | xcal | intr | ithr | csw | icsw | migr | smtx | srw | syscl | usr | sys | wt | idl |
| 1 | 1 | 0 | 101 | 20000 | 20000 | 52 | 3 | 4 | 5 | 0 | 6 | 0 | 60 | 0 | 39 |
| 2 | 2 | 0 | 3 | 104 | 103 | 54 | 3 | 4 | 5 | 0 | 7 | 0 | 1 | 0 | 99 |

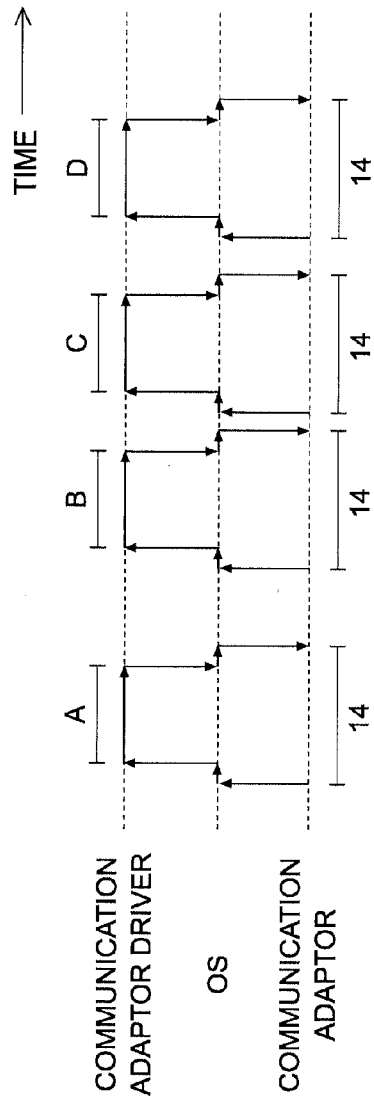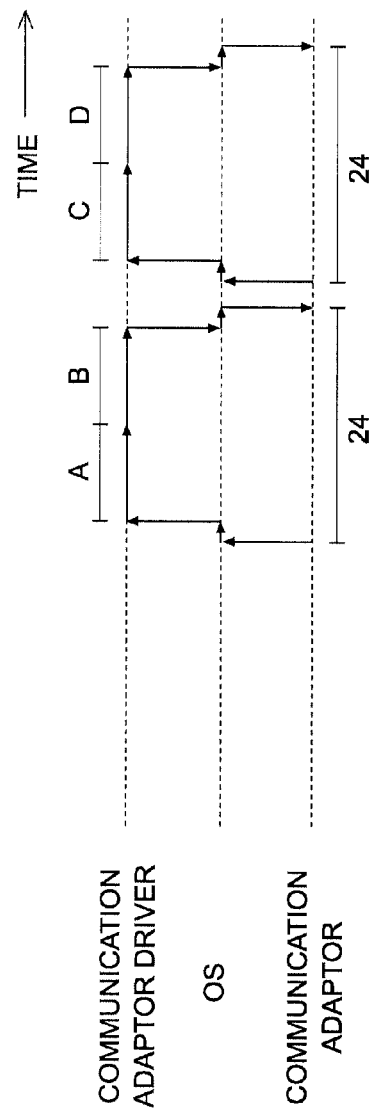

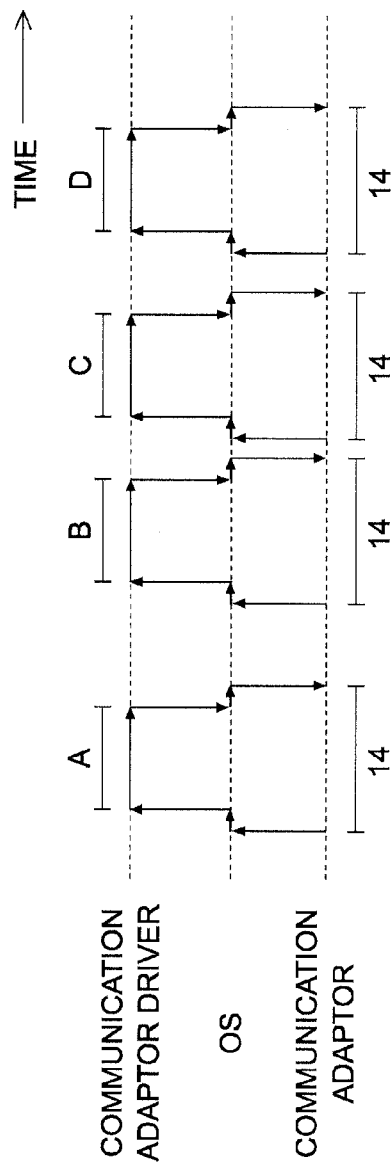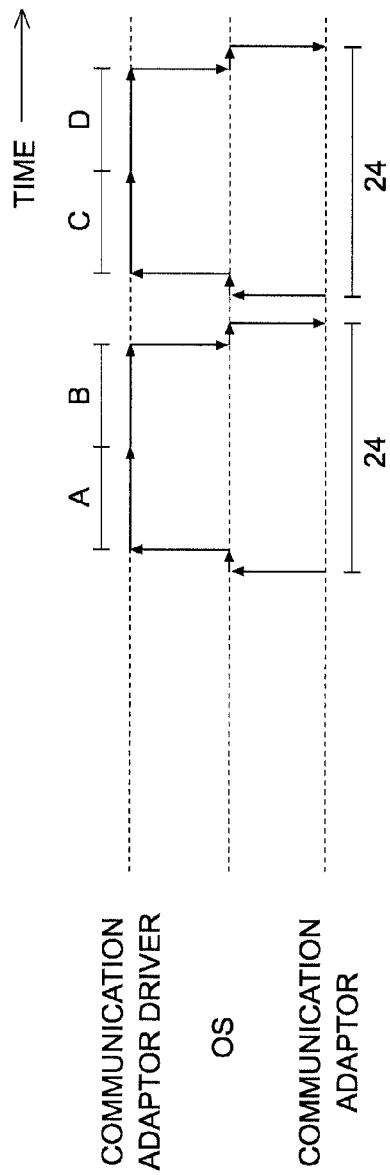

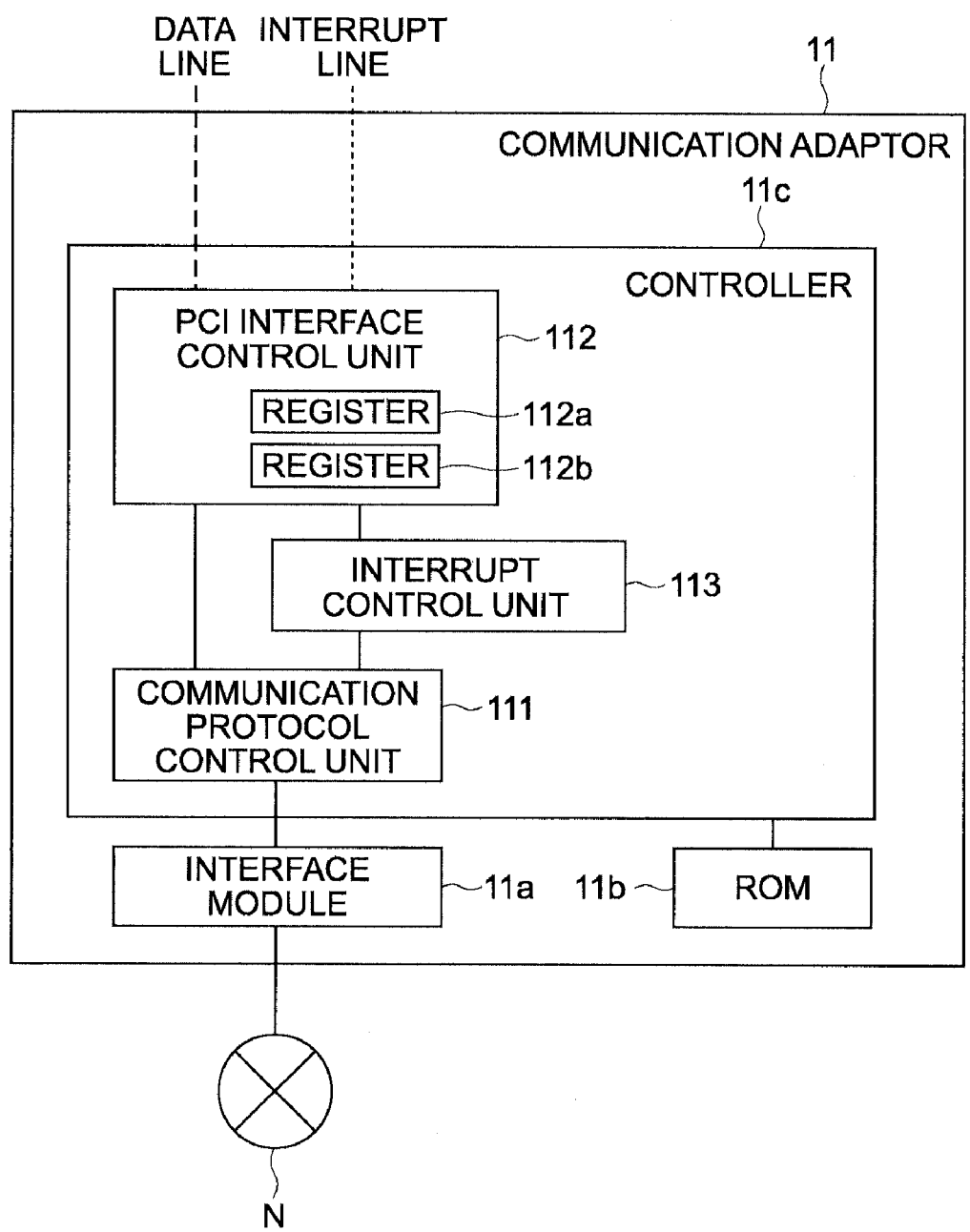

INFORMATION PROCESSING APPARATUS, INTERRUPT CONTROL DEVICE AND INTERRUPT CONTROL METHOD

CROSS-REFERENCE TO RELATED APPLICATIONS

This is a continuation of Application PCT/JP2008/056377, filed on Mar. 31, 2008, now pending, the entire contents of which are herein wholly incorporated by reference.

FIELD

The embodiments discussed herein are related to an information processing apparatus, an interrupt control device and an interrupt control method.

BACKGROUND

As broadly known, over the recent years, a variety of communication standards having higher communication speeds such as Ethernet (trademark of Xerox Corp. in U.S.A.) or Fibre Channel have been developed, and there have been an increased number of computers each mounted with a communication adaptor (an expansion card functioning as a communication interface) pursuant to these types of communication standards.

The normal communication adaptor is contrived to interrupt a CPU [Central Processing Unit] via a PCI [Peripheral Components Interconnect] bus and a host bridge each time a process (transmission or reception) related to one piece of data is completed. Therefore, an interrupt count per unit time when the communication adaptor interrupts the CPU rises as the communication speed increases. Then, if a plurality of communication adaptors operating fast is mounted in the computer, such a problem arises that a considerable load is applied to the CPU.

[Patent Document 1] International Publication WO03/063002
  [Patent Document 2] Japanese Laid-Open Patent Publication No. 2002-023961
  [Patent Document 3] Japanese Laid-Open Patent Publication No. H11-015800
  [Patent Document 4] Japanese Laid-Open Patent Publication No. S53-145536
  [Patent Document 5] Japanese Laid-Open Patent Publication No. S52-047648

SUMMARY

According to an aspect of the embodiment, an information processing device includes: an interrupt generating unit to generate an interrupt; an interrupt control unit to receive the generated interrupt, count an interrupt reception count per unit time, notify of the interrupt and delay, if the counted interrupt reception count per unit time exceeds a predetermined value, the interrupt notification; and an interrupt processing unit to process the notified interrupt.

According to another aspect of the embodiment, an information processing device includes: an interrupt generating unit to generate an interrupt; an interrupt control unit to receive the generated interrupt, delay the received interrupt notification, and notify of, when receiving a first new interrupt from the interrupt generating unit while delaying the interrupt notification, the interrupt with its notification delayed and the received first new interrupt; and an interrupt processing unit to process the notified interrupt.

Note that the operation related to the information processing device disclosed above can be realized by an interrupt control method or an interrupt control program stored on a computer readable medium.

The object and advantages of the embodiments will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 9 is a diagram illustrating an example of a reply of a system load;
FIGS. 10A and 10B are sequence diagrams illustrating a state where time taken for the CPU to execute the interrupt is reduced by about 15%;
FIGS. 14A and 14B are sequence diagrams illustrating the state where the time taken for the CPU to execute the interrupt is reduced by about 15%;
FIG. 15 is a diagram of a configuration of the communication adaptor in a third embodiment.

DESCRIPTION OF EMBODIMENTS

Three examples of a computer will hereinafter be discussed by way of embodiments of an information processing device disclosed herein with reference to the drawings.

Figure 1:
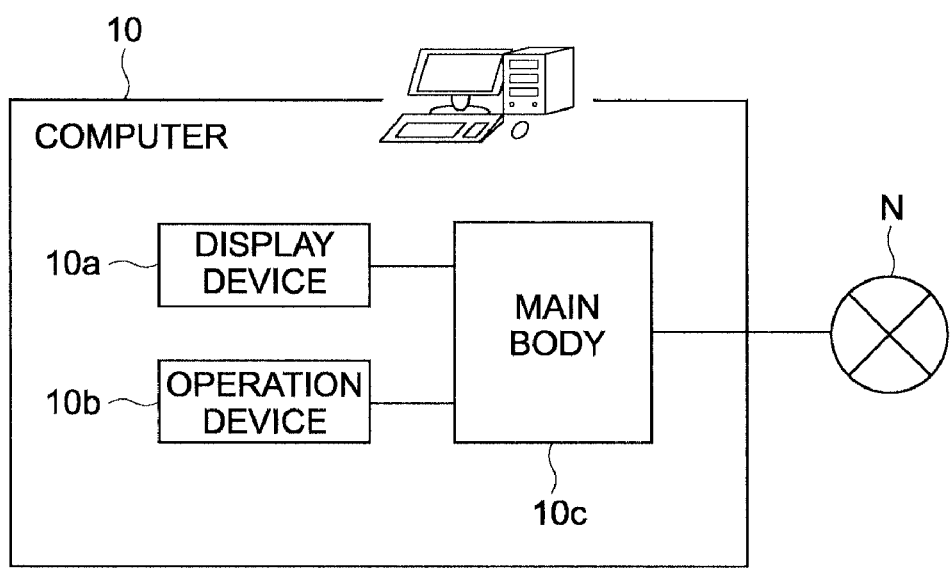
FIG. 1 is a diagram of a hardware configuration of a computer in a first embodiment.

FIG. 1 is a diagram of a hardware configuration of a computer 10 in a first embodiment.

As illustrated in FIG. 1, the computer 10 in the first embodiment includes a display device 10*a* such as a liquid crystal display etc., an operation device 10*b* such as a keyboard, a mouse, etc. and a main body 10c connected to these devices 10a and 10b. The main body 10c is connected to a network N.

Figure 2:
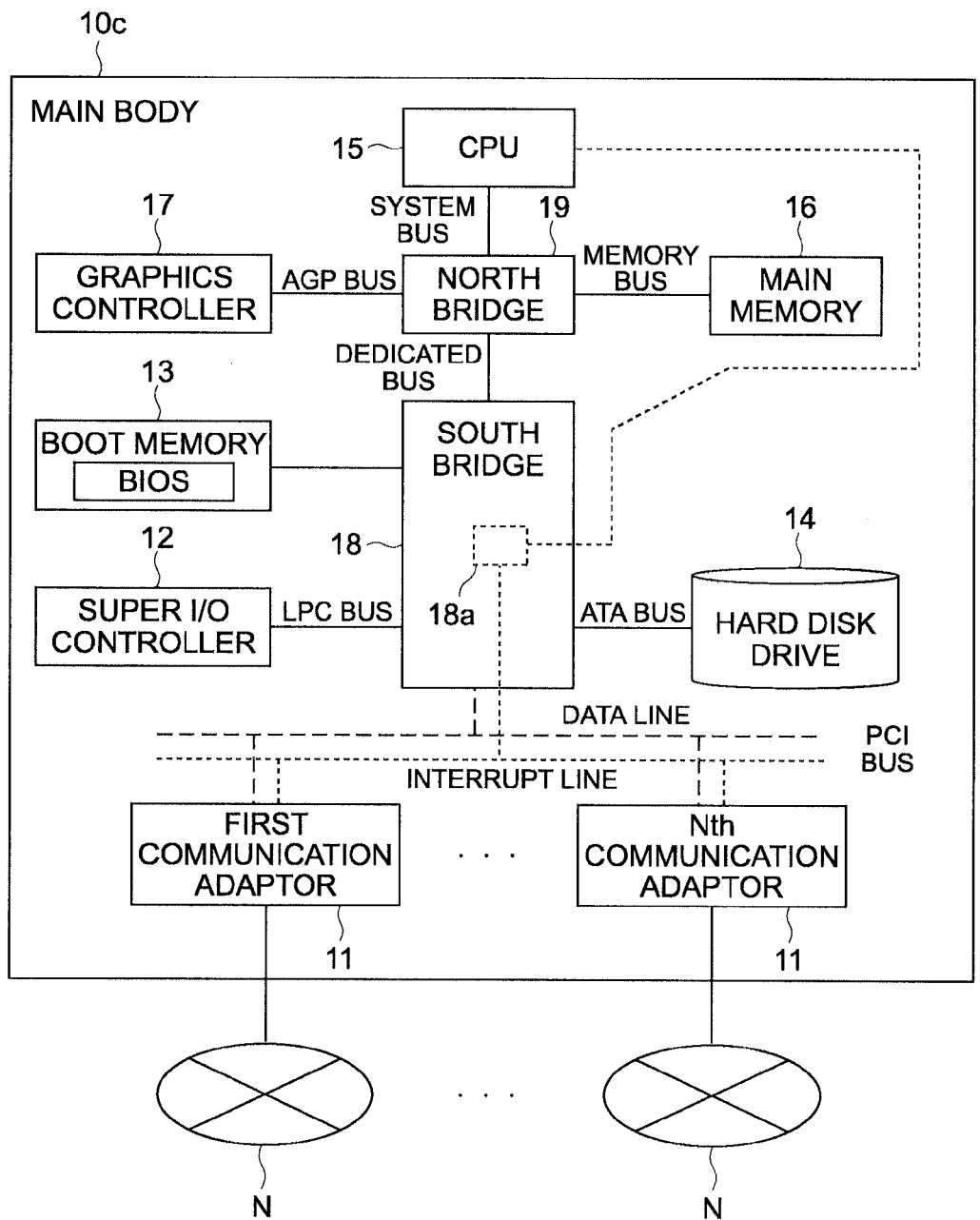
FIG. 2 is a diagram of a configuration of a main body.

FIG. 2 is a diagram of a configuration of the main body 10c.

As depicted in FIG. 2, the main body 10c incorporates a communication adaptor 11, a super I/O [Input/Output] controller 12, a boot memory 13, a hard disk drive 14, a CPU [Central Processing Unit] 15, a main memory 16, a graphics controller 17, a south bridge 18 performing a role of an integrated I/O controller and a north bridge 19 performing a role of a memory controller.

The communication adaptor 11 is a device which transfers and receives data to and from other computers on the network N. The communication adaptor 11 is exemplified such as an Ethernet expansion card and a fibre channel expansion card.

The super I/O controller 12 is a device which transfers and receives the data to and from a device connected via an I/O port such as a PS/2 [Personal System/2] port. The operation device 10b in FIG. 1 is connected to this super I/O controller 12.

The boot memory 13 is a flash memory recorded with a BIOS [Basic Input/Output System] program that is executed immediately after starting the computer 10.

The hard disk drive 14 is a device which executes writing and reading to and from the hard disk defined as a disk medium. The hard disk is, as will be described later on, recorded with various categories of software such as operating system (OS) software, network driver software and application software.

The CPU 15 is a device which executes the processes according to the programs in the boot memory 13 and the hard disk drive 14.

The main memory 16 is a unit used for the CPU 15 to cache the programs and the data and to deploy a working area.

The graphics controller 17 is a device which generates and outputs a video signal based on rendering data transferred from the CPU 15. The display device 10a in FIG. 1 is connected to this graphics controller 17.

The south bridge 18 is an LSI [Large Scale Integration] mounted with controllers for controlling a PCI [Peripheral Components Interconnect] device, an LPC [Low Pin Count] device and an ATA [Advanced Technology Attachment] device respectively. The super I/O controller 12 is connected via the LPC bus to the south bridge 18, and the hard disk drive 14 is connected via an ATA bus to the south bridge 18. Further, in the first embodiment, the first through Nth communication adaptors 11 are connected via the PCI bus to the south bridge 18.

Furthermore, the south bridge 18 performing the role of the integrated I/O controller is mounted with a controller for controlling access to the boot memory 13 and with a DMA [Direct Memory Access] controller serving as an access controller. The DMA controller is a controller for transmitting the data within the hard disk drive 14 to the main memory 16 without via the CPU 15.

Moreover, the south bridge 18 is mounted with an interrupt controller 18a. The interrupt controller 18a is a controller for monitoring occurrence of the interrupt at the PCI device (the communication adaptor 11 in the first embodiment) and notifying the CPU 15 of the occurred interrupt as a hardware interrupt.

The north bridge 19 performing the role of the memory controller is an LSI on which controllers are mounted which respectively control the CPU 15, the main memory 16 and the graphics controller 17. To the north bridge 19, the CPU 15 is connected via a system bus, the main memory 16 is connected to via a memory bus, and the graphics controller 17 is connected via an AGP [Accelerated Graphics Port] bus.

Further, the north bridge 19 implements a bus-bus bridge function of controlling the data transfer between the CPU 15 and the south bridge 18, and is connected via a dedicated bus to the south bridge 18. The dedicated bus is exemplified by A-Link (trademark of Ali Corp. in Taiwan), Hyper Transport (trademark of Advanced Micro Devices, Inc. (AMD) in U.S.A.), MuTIOL (trademark of Silicon Integrated Systems Corp. in Taiwan) and V-Link (trademark of VIA Technology Corp. in Taiwan)

Figure 3:
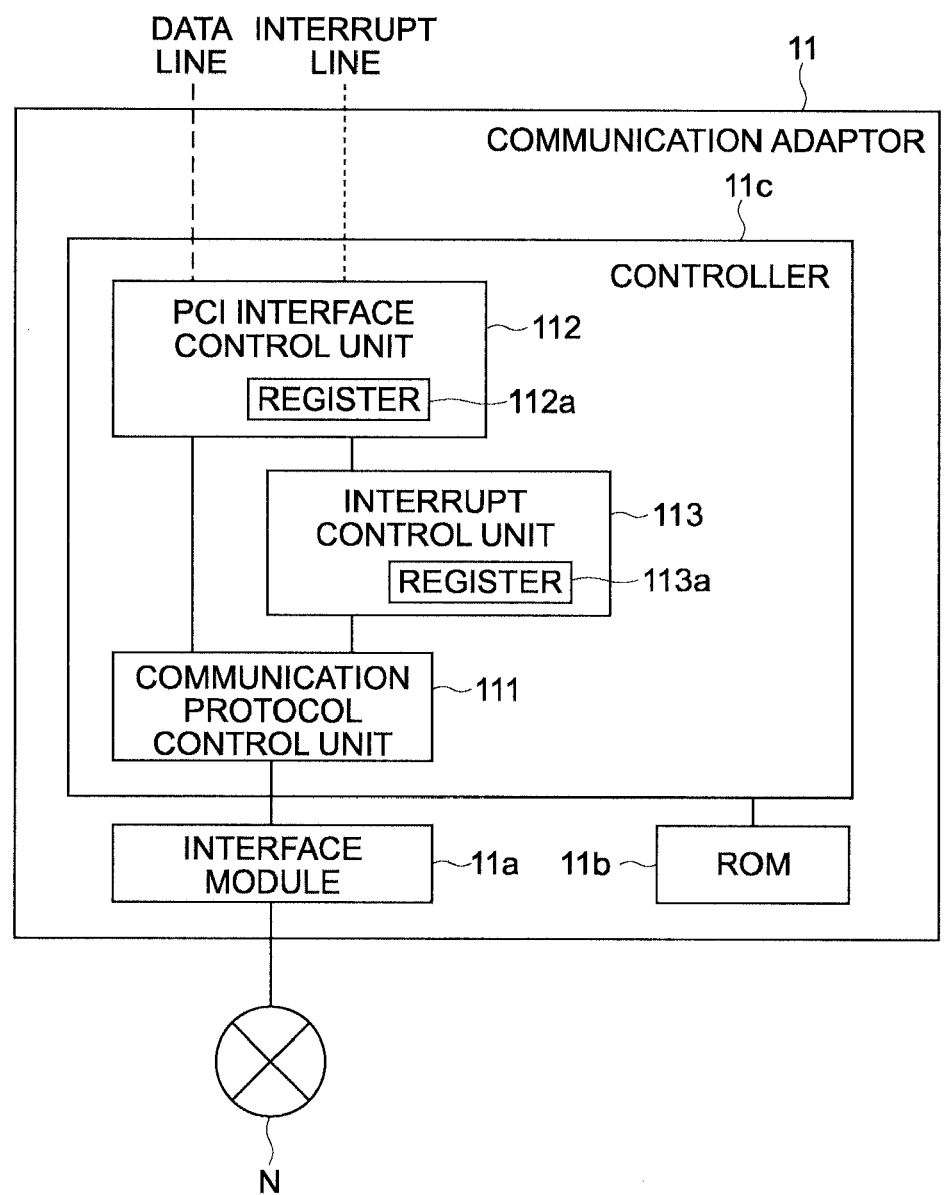
FIG. 3 is a diagram of a configuration of a communication adaptor.

FIG. 3 is a diagram of a configuration of the communication adaptor 11.

As illustrated in FIG. 3, the communication adaptor 11 includes an interface module 11a, a ROM [Read Only Memory] 11b and a controller 11c. The interface module 11a is a module for transferring and receiving the data to and from the devices on the network N. The ROM 11b is a device recorded with information on the communication adaptor 11. The controller 11c is a device for controlling the communication adaptor 11.

The controller 11c includes a communication protocol control unit 111, a PCI interface control unit 112 and an interrupt control unit 113.

The communication protocol control unit 111 is a unit which controls the communications based on a communication protocol. The communication protocol control unit 111 is contrived to generate an interrupt upon detecting a predetermined event. Note that the event as a factor of the interrupt generation is exemplified such as normal completion of I/O, an abnormal end of I/O, receiving a frame, and detecting an error of the hardware.

It should be noted that the communication protocol control unit 111 corresponds to the interrupt occurrence unit described above.

The PCI interface control unit 112 is a unit for transferring and receiving, via data lines within the PCI bus, the data to and from the PCI device connected to the PCI bus and for notifying of the interrupt via an interrupt line within the PCI bus. The PCI interface control unit 112 includes a register 112a recorded with, as an interrupt factor, the event becoming the factor for the interrupt generation.

The interrupt control unit 113 is a unit for controlling the interrupt. To be specific, the interrupt control unit 113 notifies the interrupt controller 18a in FIG. 2 of the interrupt generated by the communication protocol control unit 111 and records the interrupt factor in the register 112a of the PCI interface control unit 112. Further, the interrupt control unit 113 includes a register 113a recorded with an upper limit value (γ [count/sec]) of an interrupt notification count per unit time. The interrupt control unit 113 controls the interrupt notification so that the interrupt notification count per unit time does not exceed the upper limit value (γ) recorded in the register 113b. For example, if the upper limit value (γ) of the interrupt notification count per unit time is set to 10,000 count per sec, the interrupt control unit 113 stops the interrupt notification at a point of time when the interrupt notification count per sec reaches 10,000 count, then stands by till next 1 sec starts, and is enabled to make the interrupt notification upon the start of next 1 sec.

Note that the interrupt control unit 113, if only one interrupt factor occurs for a period till the next notification is done since the interrupt notification was executed, as illustrated in a sequence diagram in FIG. 4, notifies a communication adaptor driver 14c, which will be explained later on, of one interrupt factor (e.g., one factor which triggers a process A in FIG. 4) in the interrupt notification given once. On the other hand, two or more events each becoming the interrupt factor occur for the period till the next notification is done since the interrupt notification was executed, the interrupt control unit 113 notifies, as illustrated in a sequence diagram in FIG. 5, the communication adaptor driver 14*c*, which will be explained later on, of plural interrupt factors (e.g., three factors which trigger the processes A through C in FIG. 5) in the interrupt notification given once.

Figure 6:
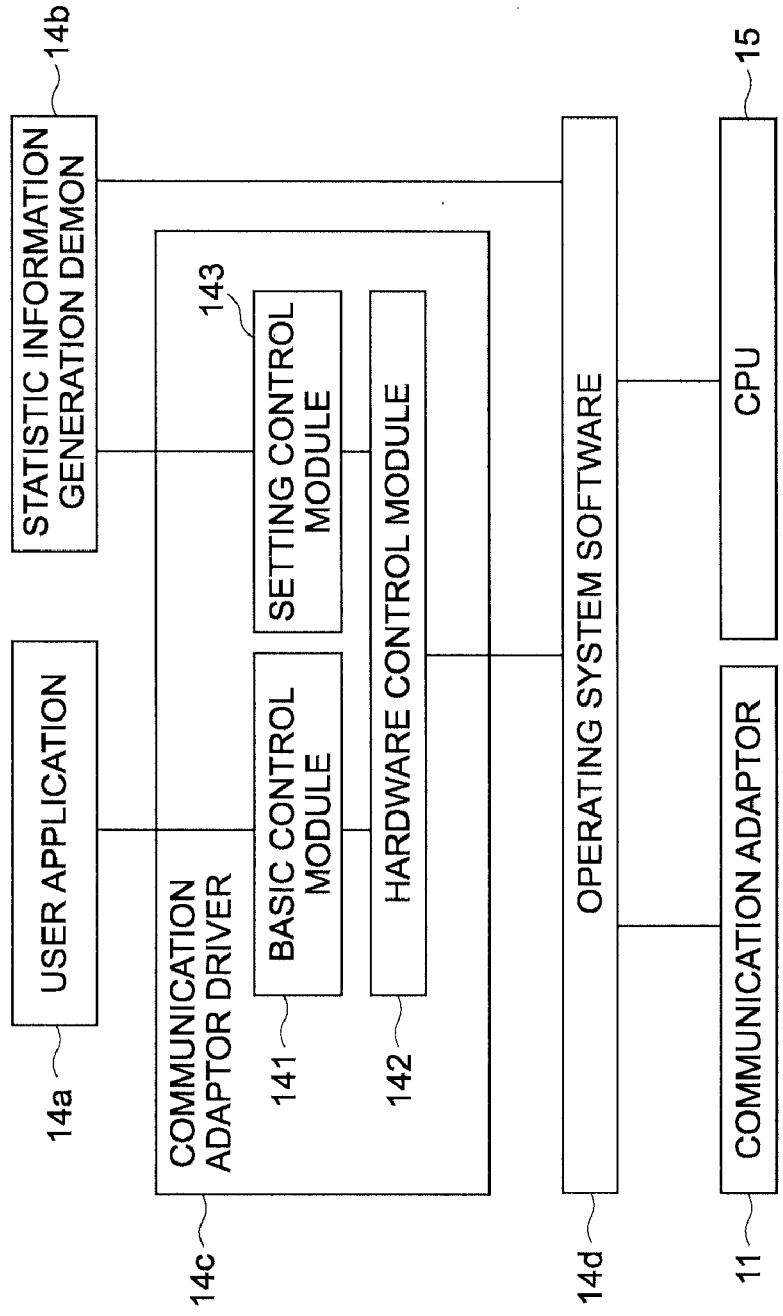
FIG. 6 is a diagram of a software configuration of the computer.

FIG. 6 is a diagram of a software configuration of the computer 10.

In the computer 10, the hard disk drive 14 is stored with a user application 14*a*, a statistic information generation demon 14*b*, the communication adaptor driver 14*c* and operating system software 14*d*.

The user application 14*a* is software for realizing services such as a document edit service, a spreadsheet service, a rendering service and a Web page browsing service on the computer 10. This user application 14*a* is a Web browser or a mailer, in which case the user application 14*a* performs the communications with a Web server or a mail server via the communication adaptor driver 14*c*.

The statistic information generation demon 14*b* is a program for setting, in the communication adaptor 11, the upper limit value (γ [count/sec]) of the interrupt notification count per unit time on the basis of an interrupt notification count (α [%]) per unit time from the communication adaptor 11 and a system load (β [%]) defined as a ratio (usage ratio) at which the time for the CPU 15 to execute the process related to this communication adaptor 11 occupies the unit time. The same number of the statistic information generation demons 14*b* as the number of the communication adaptor drivers 14*c* are prepared in the computer 10. Note that a content of the process executed by the CPU 15 according to the statistic information generation demon 14*b* will be described later on with reference to FIG. 7.

The communication adaptor driver 14*c* is software for controlling the communication adaptor 11. The same number of the communication adaptor drivers 14*c* as the number of communication adaptors 11 are prepared in the computer 10. The communication adaptor driver 14*c* includes a basic control module 141, a hardware control module 142 and a setting control module 143.

The basic control module 141 is a module which transmits a command to the communication adaptor 11, transfers and receives the data between the user application 14*a* and the communication adaptor 11, transmits the command to the communication adaptor 11 and executes a process corresponding to the interrupt factor related to the interrupt generated by the communication protocol control unit 111 of the communication adaptor 11.

The hardware control module 142 is a module which converts formats of data and commands between the basic control module 141 and the communication adaptor 11.

The setting control module 143 is a module for controlling the information set in the communication adaptor 11. A content of the process executed by the CPU 15 according to this setting control module 143 will be described later on with reference to FIG. 8.

The operating system software 14*d* is software for providing an API [Application Programming Interface] and an ABI [Application Binary Interface] to the variety of applications, managing the storage areas of the hard disk drive 14 and the main memory 16, managing a process and a task, providing utilities such as file management, the variety of setting tools and editors to the applications and allocating windows to a plurality of tasks for multiplexing the screen outputs.

The operating system software 14*d* includes a function of monitoring the interrupt notification given from the communication adaptor 11. Further, this operating system software 14*d* includes a function of executing, upon detecting the interrupt notification, a process (a process X in FIGS. 4 and 5) of acquiring the interrupt factor from the register 112*a* of the PCI interface control unit 112 of the communication adaptor 11, and transferring this interrupt factor to the communication adaptor driver 14*c*.

More specifically, the operating system software 14*d* executes, upon detecting the interrupt notification given from the communication adaptor 11, the process related to the interrupt on the basis of a predetermined interrupt priority level. Note that the main interrupts are sequenced in the order from the highest priority level such as a PIO [Programmed I/O] serial interrupt, a clock interrupt, an interrupt from the communication adaptor 11, an interrupt related to the access to the disk device and a software interrupt. The operating system software 14*d* determines, when detecting the interrupt notification, whether the priority level of the process related to an in-execution interrupt at that point of time is higher or lower than the priority level of the interrupt of which the notification is detected. Then, if the priority level of the interrupt of which the notification is detected is higher, the operating system software 14*d* prioritizes the process related to the interrupt of which the notification is detected in a way that suspends the in-execution process at that point of time, and gets the process related to this interrupt to stand by if the priority level of the interrupt of which the notification is detected is lower. Further, the operating system software 14*d* acquires, if an interrupt notifying destination is the communication adaptor 11, one or more interrupt factors from the register 112*a* of the PCI interface control unit 112 of the communication adaptor 11, and invokes an interrupt handler within the basic control module 141 in the communication adaptor driver 14*c* (the process X in FIGS. 4 and 5). It is to be noted that this interrupt handler carries out processes (the processes A through C in FIGS. 4 and 5) corresponding to one or more interrupt factors, and clears the register 112*a* of the PCI interface control unit 112 of the communication adaptor 11. The operating system software 14*d*, when the interrupt handler finishes the processes, executes a process of getting the suspended process to resume (a process Y in FIGS. 4 and 5).

Note that the CPU 15 executing the operating system software 14*d* and the CPU 15 executing the basic control module 141 and the hardware control module 142 of the communication adaptor driver 14*c*, correspond to the interrupt processing unit described above.

<Generation of Statistic Information>

After switching on the main power source of the computer 10, the CPU 15 reads the statistic information generation demon 14*b*, thereby starting a statistic information generation process.

Figure 7:
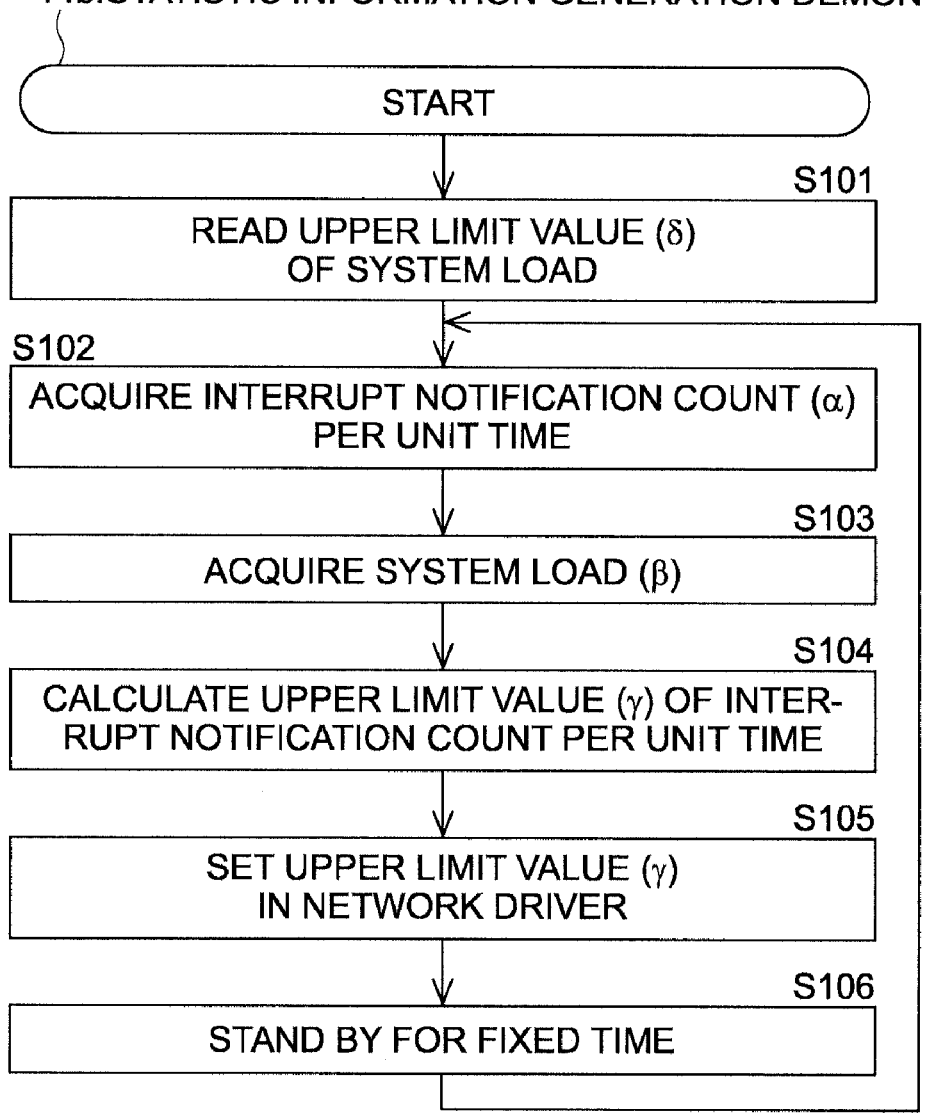
FIG. 7 is a flowchart illustrating a flow of a statistic information generation process.

FIG. 7 is a flowchart illustrating a flow of the statistic information generation process.

After starting the statistic information generation process, in first step S101, the CPU 15 reads an upper limit value (δ [%]) of the system load. This upper limit value (δ) of the system load is previously included in the communication adaptor driver 14*c* corresponding thereto and implies an upper limit value of the system load (which is a ratio at which the time for the CPU 15 to execute the process related to this communication adaptor 11 occupies the unit time, i.e., the usage ratio) accompanying the operation of the communication adaptor 11 controlled by the communication adaptor driver 14c. Upon reading the upper limit value (δ) of the system load, the CPU 15 advances the processing to step S102.

In step S102, the CPU 15 acquires the notification count (α) per unit time of the corresponding communication adaptor 11 from the hardware control module 142 via the setting control module 143.

In next step S103, the CPU 15 acquires the system load (β) from the operating system software 14d.

In next step S104, the CPU 15 calculates the upper limit value (γ [count/sec]) of the interrupt notification count per unit time. To be specific, the CPU 15, to begin with, divides the upper limit value (δ [%]) of the system load read in step S101 over the system load (β [%]) acquired in step S103, and subsequently multiplies the value obtained from this division by the interrupt notification count (α [count/sec]) per unit time that is acquired in step S102. The CPU 15 calculates the upper limit value (γ [count/sec]) of the interrupt notification count per unit time by this arithmetic formula (δ□β)□α.

In subsequent step S105, the CPU 15 sets the upper limit value (γ) calculated in step S104 in the communication adaptor driver 14c.

In next step S106, the CPU 15 stands by for a fixed period of time and thereafter loops the processing back to step S102.

According to the statistic information generation process described above, it follows that the upper limit value (γ) per unit time is periodically set in the communication adaptor driver 14c.

<Setting Control>

After switching on the main power source of the computer 10, the CPU 15 reads the setting control module 143, thereby starting the setting control process.

Figure 8:
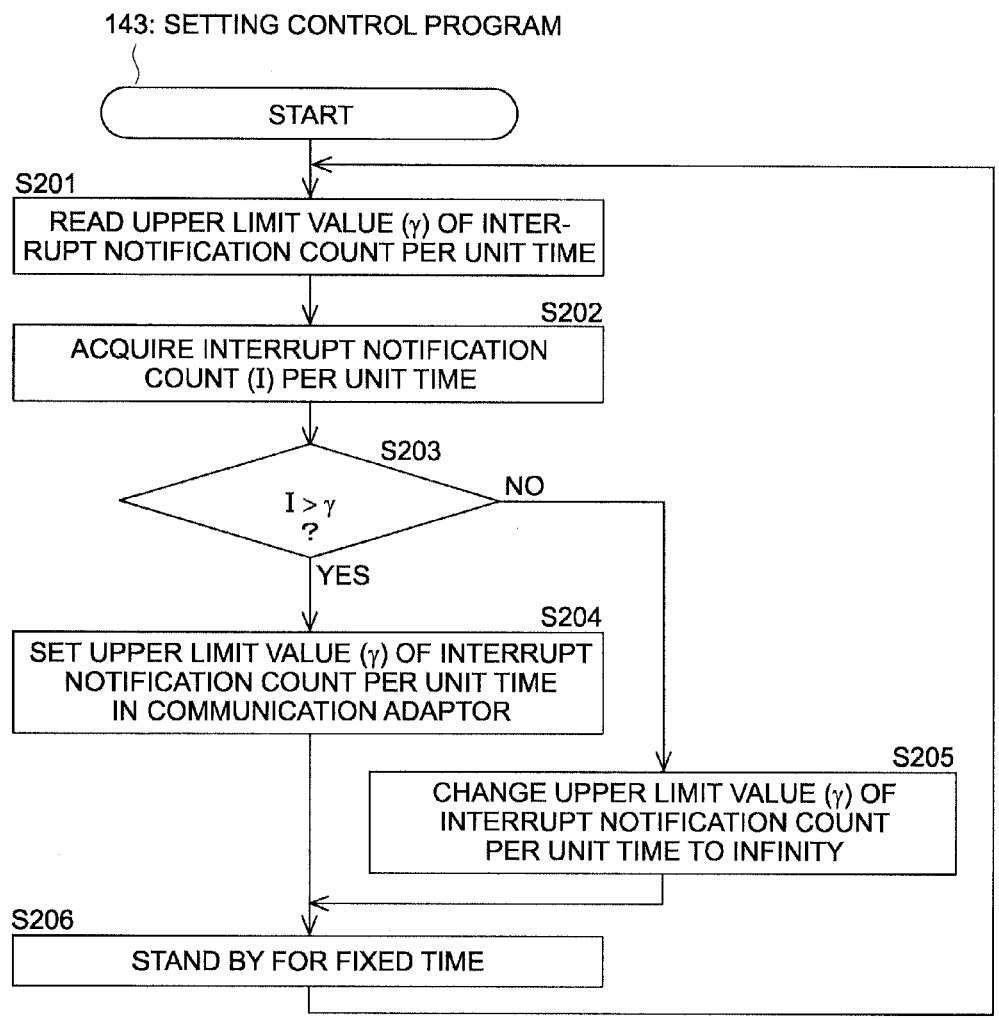
FIG. 8 is a flowchart illustrating a flow of a setting control process.

FIG. 8 is a flowchart illustrating a flow of the setting control process.

After starting the setting control process, in first step S201, the CPU 15 reads the upper limit value (γ) of the interrupt notification count per unit time that is set in the communication adaptor driver 14c.

In next step S202, the CPU 15 acquires the interrupt notification count (I [count/sec]) per unit time of the corresponding communication adaptor 11 from the hardware control module 142.

In next step S203, the CPU 15 determines whether or not the interrupt notification count (I) per unit time that is acquired in step S202 exceeds the upper limit value (γ) read in step S201. Then, if the interrupt notification count (I) per unit time exceeds the upper limit value (γ), the CPU 15 advances the processing to step S204.

In step S204, the CPU 15 sets the upper limit value (γ [count/sec]) of the interrupt notification count per unit time that is read in step S201 in the communication adaptor 11 via the hardware control module 142. Note that the controller 11c of the communication adaptor 11 records the upper limit value (γ) of the interrupt notification count per unit time in the register 113a within the interrupt control unit 113. Thereafter, the CPU 15 advances the processing to step S206.

While on the other hand, in step S203, if the interrupt notification count (I [count/sec]) per unit time acquired in step S202 is equal to or lower than the upper limit value (γ [count/sec]) read in step S201, the CPU 15 diverts the processing to step S205 from step S203.

In step S205, the CPU 15 changes the upper limit value (γ) set in the communication adaptor 11 to the infinity. Thereafter, the CPU 15 advances the processing to step S206.

In step S206, the CPU 15 stands by for a fixed period of time and thereafter loops the processing back to step S201.

According to the setting control process described above, if the interrupt notification count (I) per unit time of the corresponding communication adaptor 11 exceeds the upper limit value (γ) set in the statistic information generation process, it follows that the interrupt notification by the communication adaptor 11 is restricted.

It should be noted that the CPU 15 executing the statistic information generation process and the setting control process and the interrupt control unit 113 within the controller 11c of the communication adaptor 11 correspond to the interrupt control unit described above.

As discussed above, in the first embodiment, the statistic information generation demon 14b periodically sets the upper limit value (γ) of the interrupt notification count per unit time in the corresponding communication adaptor driver 14c on the basis of the upper limit value (δ) of the system load of the corresponding communication adaptor 11, the actually-measured system load (α) and the interrupt notification count (β) per unit time (steps S101-S106).

Further, the setting control module 143 executed in parallel with this statistic information generation demon 14b periodically determines whether or not the interrupt notification count (I) per unit time actually measured with respect to the corresponding communication adaptor 11 exceeds the upper limit value (γ) (steps S201-S203), and, if the interrupt notification count (I) per unit time exceeds the upper limit value (γ), restricts the interrupt of the communication adaptor 11 (step S203; Yes, S204).

The operating system software 14d called, e.g., Solaris (trademark of Sun Microsystems in U.S.A.), when receiving a command named [mpstat], gives a reply of the system load (usage ratio) per CPU 15.

FIG. 9 is a diagram illustrating an example of the reply.

As given in an [intr] field in the example of the reply in FIG. 9, the CPU 15 having the number "1" receives the interrupt notifications counted 20000 per sec (α=20000). Further, as given in a [sys] field in the example of the reply in FIG. 9, the CPU 15 having the number "1" is 60% in its system load (usage ratio) (β=60).

Then, with respect to one of the communication adaptor drivers 14c within the computer 10 in the first embodiment, if 30% is set in the upper limit value (δ=30) of the system load of the CPU 15 having the number "1", which accompanies the operation of the communication adaptor 11 corresponding to the one communication adaptor driver 14c, the interrupt notification count per unit time has substantially a proportional relation with the system load, and hence the upper limit value (γ) of the interrupt notification count per unit time of the communication adaptor 11 is estimated such as γ=(ε÷β)×α (30÷60)×20000=10000 [count/sec] (step S104).

Herein, an assumption is that the time required for the operating system software 14d to execute the process (the process X in FIGS. 4 and 5) of acquiring the interrupt factor is on the order of 2 μsec, the average time required for the basic control module 141 of the communication adaptor driver 14c to execute the process for one interrupt factor is on the order of 10 μsec, and the time taken for the operating system software 14d to execute a subsequent stage process (a process Y in FIGS. 4 and 5) after the communication adaptor driver 14c has executed the process corresponding to the interrupt factor is on the order of 2 μsec.

Then, supposing that one interrupt factor is transferred to the communication adaptor driver 14c through the one interrupt notification, the CPU 15 having the number "1" illustrated in FIG. 9 receives the interrupt notifications counted 20000 per second, and hence the time taken for the interrupt process per second is given such as 20000×(2+10+2)=280000

μsec. Note that the processing time of the CPU 15 per interrupt notification is given by 280000÷20000=14 μsec.

On the other hand, in the first embodiment, if the upper limit value of the interrupt notification count per unit time of the communication adaptor 11 is restricted to 10000 count/sec, the processes are executed for 20000-pieces of interrupt factors with respect to the interrupt notifications counted 10000 per second, and therefore the time taken for the CPU 15 having the number "1" illustrated in FIG. 9 to execute the interrupt process is given by 20000×10+10000×(2+2)=240000 μsec. Note that the processing time of the CPU 15 per interrupt notification is given by 240000÷10000=24 μsec.

Accordingly, in the first embodiment, the time taken for the CPU 15 having the number "1" illustrated in FIG. 9 to execute the interrupt process is reduced by about 15% (240000÷280000=0.857). FIGS. 10A and 10B are sequence diagrams illustrating a state where the time taken for the CPU 15 to execute the interrupt process is reduced by approximately 15%.

It should be noted that in the first embodiment discussed above, the upper limit value (γ) of the interrupt notification count per unit time is dynamically set in the communication adaptor driver 14c through the statistic information generation process in FIG. 7, however, this upper limit value (γ) may also be statically set in a setting file of the communication adaptor driver 14c.

A second embodiment is different from the first embodiment in terms of such a point that not the upper limit value (γ [count/sec]) of the interrupt notification count per unit time but the lower limit value (1/γ [sec/count]) of the interrupt notification interval is set in the communication adaptor 11. The hardware configuration and the software configuration other than this different point in the second embodiment are the same as in the first embodiment.

Figure 11:
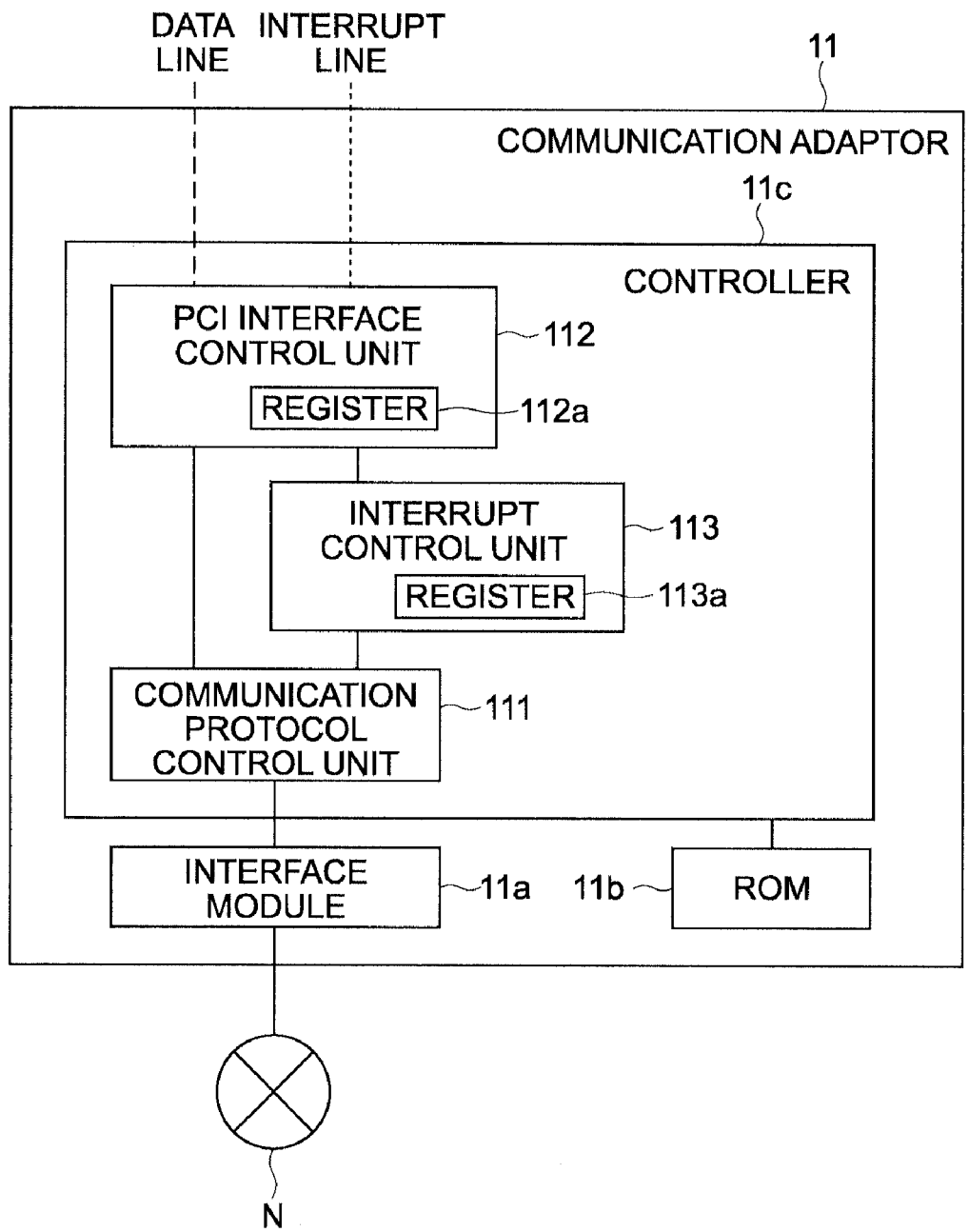
FIG. 11 is a diagram of a configuration of the communication adaptor in a second embodiment.

FIG. 11 is a diagram of a configuration of the communication adaptor 11 in the second embodiment.

The interrupt control unit 113 of the communication adaptor 11 in the second embodiment includes a register 113b recorded with the lower limit value (1/γ [sec/count]) of the interrupt notification interval. The interrupt control unit 113 controls the interrupt notification so that the interrupt notification interval does not exceed the lower limit value (1/γ) recorded in the register 113b. For example, if (1/10000) sec per count is the lower limit value (1/γ) of the interrupt notification interval, the interrupt control unit 113, after making the one interrupt notification, stops the interrupt notification till an elapse of (1/10000) sec and stops the interrupt notification at a point of time when the interrupt notification reaches 10000 count after 1 sec, and, after the elapse of (1/10000) sec, the next interrupt notification can be made.

Figure 4:
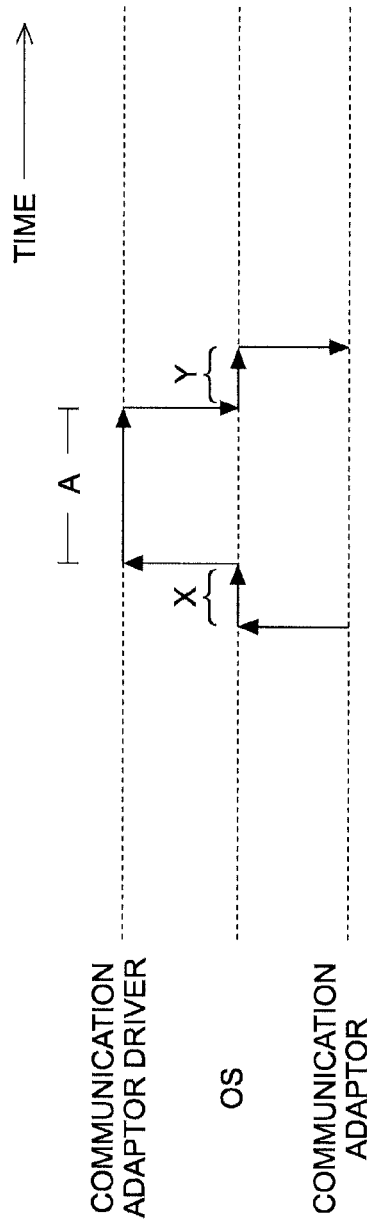
FIG. 4 is a sequence diagrams in the case of transferring one interrupt factor through an interrupt notification made once.
Figure 5:
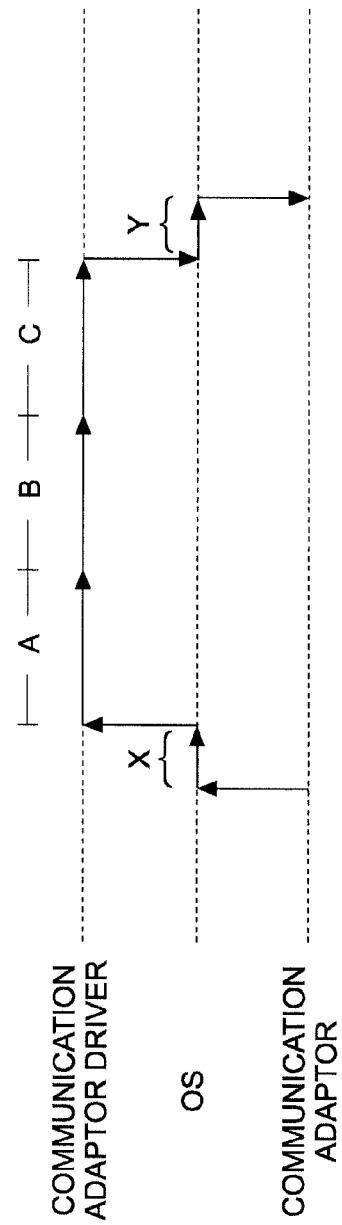
FIG. 5 is a sequence diagram in the case of transferring three interrupt factors through the interrupt notification made once.

Note that the interrupt control unit 113, if only one event becoming the interrupt factor occurs till the next notification is made after the interrupt notification has been made, as illustrated in the sequence diagram of FIG. 4, notifies the communication adaptor driver 14c of one interrupt factor (e.g., one factor which triggers the process A in FIG. 4) in the interrupt notification made once. On the other hand, if two or more events each becoming the interrupt factor occurs for the period till the next notification is done since the interrupt notification was executed, the interrupt control unit 113 notifies, as illustrated in the sequence diagram in FIG. 5, the communication adaptor driver 14c, which will be explained later on, of plural interrupt factors (e.g., three factors which trigger the processes A through C in FIG. 5) in the interrupt notification given once.

Figure 12:
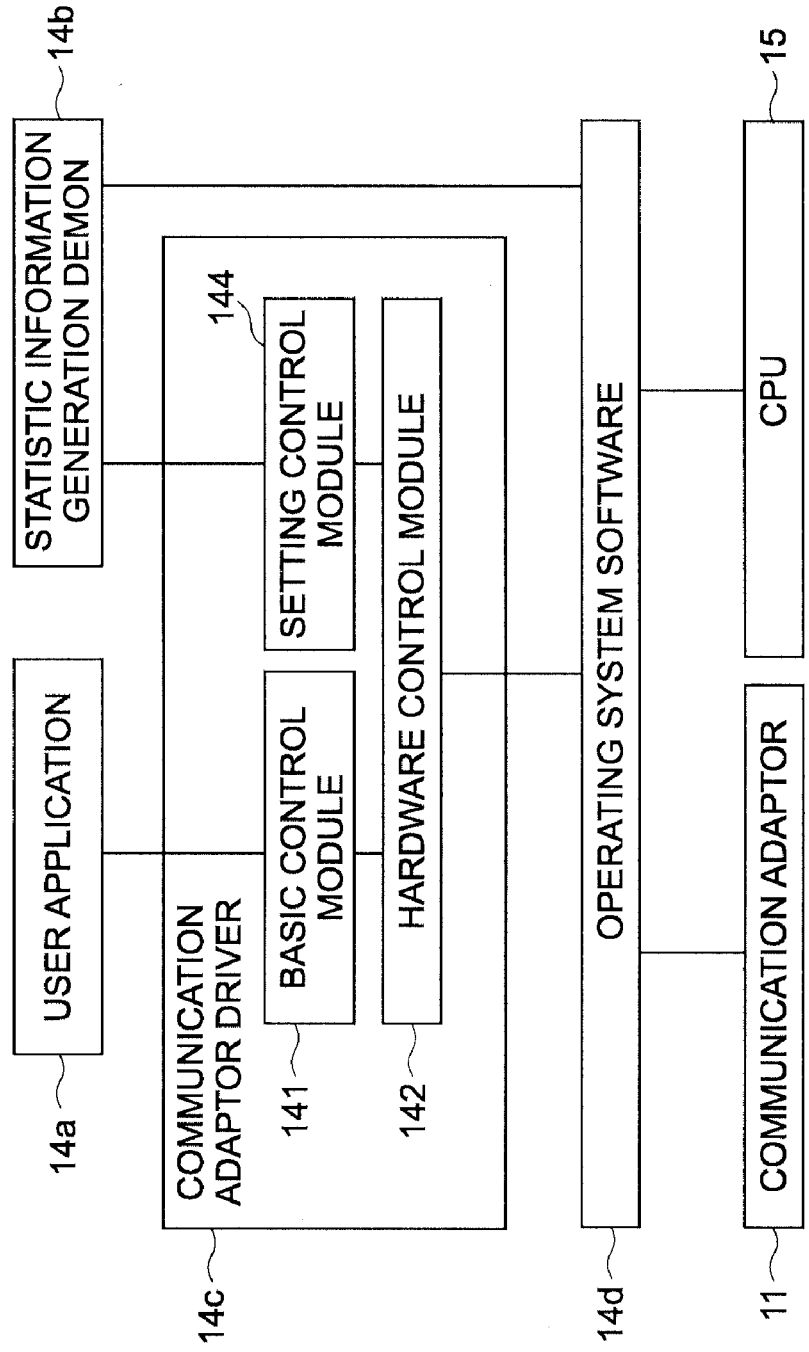
FIG. 12 is a diagram of a software configuration of the computer in the second embodiment.

FIG. 12 is a diagram of a software configuration of the computer 10 in the second embodiment.

The communication adaptor driver 14c in the second embodiment includes a setting control module 144. The setting control module 144 executes a process slightly different from the process by the setting control module 143 (FIG. 6) in the first embodiment.

After switching on the main power source of the computer 10, the CPU 15 reads the setting control module 144, thereby starting a setting control process.

Figure 13:
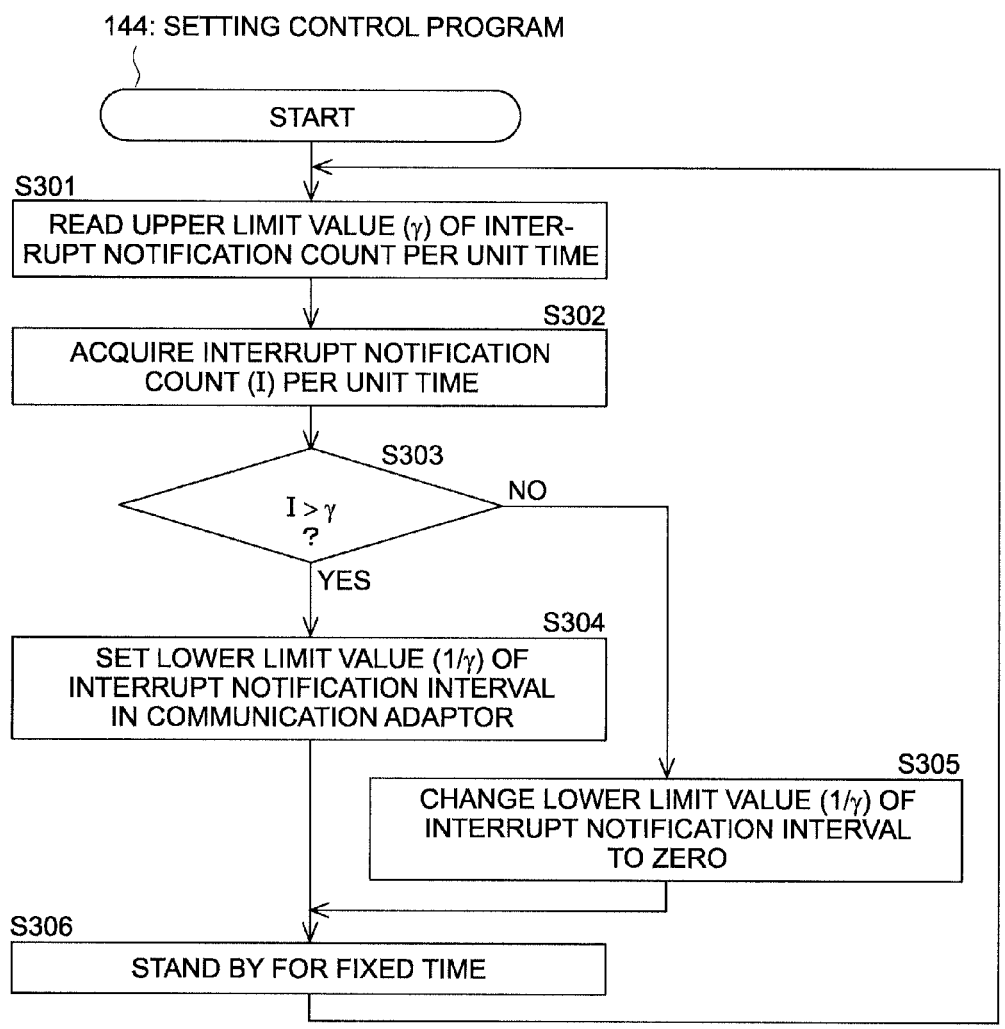
FIG. 13 is a flowchart illustrating a flow of the setting control process in the second embodiment.

FIG. 13 is a flowchart illustrating a flowof the setting control process in the second embodiment.

After starting the setting control process, in first step S301, the CPU 15 reads the upper limit value (γ [count/sec]) of the interrupt notification count per unit time that is set in the communication adaptor driver 14c.

In next step S302, the CPU 15 acquires the interrupt notification count (I [count/sec]) per unit time of the corresponding communication adaptor 11 from the hardware control module 142.

In next step S303, the CPU 15 determines whether or not the interrupt notification count (I) per unit time that is acquired in step S302 exceeds the upper limit value (γ) read in step S301. Then, if the interrupt notification count (I) per unit time exceeds the upper limit value (γ), the CPU 15 advances the processing to step S304.

In step S304, the CPU 15 sets, in the communication adaptor 11, the lower limit value (1/γ [sec/count]) of the interrupt notification interval per unit time, which is an inverse number of the upper limit value (γ [count/sec]) of the interrupt notification count per unit time that is read in step S301 via the hardware control module 142. Note that the controller 11c of the communication adaptor 11 records the lower limit value (1/γ) of the interrupt notification interval in the register 113b within the interrupt control unit 113. Thereafter, the CPU 15 advances the processing to step S306.

While on the other hand, in step S303, if the interrupt notification count (I [count/sec]) per unit time acquired in step S302 is equal to or lower than the upper limit value (γ [count/sec]) read in step S301, the CPU 15 diverts the processing to step S305 from step S303.

In step S305, the CPU 15 changes the lower limit value (1/γ) set in the communication adaptor 11 to zero. Thereafter, the CPU 15 advances the processing to step S306.

In step S306, the CPU 15 stands by for a fixed period of time and thereafter loops the processing back to step S301.

According to the setting control process described above, if the interrupt notification count (I) per unit time of the corresponding communication adaptor 11 exceeds the upper limit value (γ) set in the statistic information generation process, it follows that the interrupt notification by the communication adaptor 11 is restricted.

In the second embodiment also, similarly to the first embodiment, the statistic information generation demon 14b periodically sets the upper limit value (γ) of the interrupt notification count per unit time in the corresponding communication adaptor driver 14c on the basis of the upper limit value (δ) of the system load of the corresponding communication adaptor 11, the actually-measured system load (α) and the interrupt notification count (β) per unit time (steps S101-S106 in FIG. 7).

Further, the setting control module 144 executed in parallel with this statistic information generation demon 14b periodically determines whether or not the interrupt notification count (I) per unit time actually measured with respect to the corresponding communication adaptor 11 exceeds the upper limit value (γ) (steps S301-S303), and, if the interrupt notification count (I) per unit time exceeds the upper limit value ($\gamma$), restricts the interrupt of the communication adaptor 11 (step S303; Yes, S304).

For example, as stated above, the CPU 15 having the number "1" illustrated in FIG. 9 receives the interrupt notifications counted 20000 per unit time ($\alpha$=20000) and is 60% in its system load (usage ratio) ($\beta$=60), in which case the upper limit value of the system load of the CPU 15 is set to 30% ($\sigma$=30), and the upper limit value ($\gamma$) of the interrupt notification count per unit time is estimated 10000 [count/sec] (step S104. Then, I=20000>$\gamma$, with the result that (1/$\gamma$)=1/10000 is set in the communication adaptor 11 (step S304).

Then, it is assumed that the time required for the operating system software 14d to execute the process (the process X in FIGS. 4 and 5) of acquiring the interrupt factor is on the order of 2 μsec, the average time required for the basic control module 141 of the communication adaptor driver 14c to execute the process for one interrupt factor is on the order of 10 μsec, and the time taken for the operating system software 14d to execute the subsequent stage process (the process Y in FIGS. 4 and 5) after the communication adaptor driver 14c has executed the process corresponding to the interrupt factor is on the order of 2 μsec.

Then, supposing that one interrupt factor is transferred to the communication adaptor driver 14c through the one interrupt notification, the CPU 15 having the number "1" illustrated in FIG. 9 receives the interrupt notifications counted 20000 per unit time, and hence the time taken for the interrupt process is given such as 20000×(2+10+2)=280000 μsec. Note that the processing time of the CPU 15 per interrupt notification is given by 280000÷20000=14 μsec.

On the other hand, in the second embodiment, if the lower limit value of the interrupt notification interval of the communication adaptor 11 is restricted to (1/10000) sec, the lower limit value of the interrupt notification interval increases twice, and therefore the two interrupt factors on the average are transferred to the communication adaptor driver 14c through the one interrupt notification. Accordingly, the time taken for the CPU 15 having the number "1" illustrated in FIG. 9 to execute the interrupt process is given by 20000×10+10000×(2+2)=240000 μsec. Note that the processing time of the CPU 15 per interrupt notification is given by 240000÷10000=24 μsec.

Accordingly, in the second embodiment also, the time taken for the CPU 15 having the number "1" illustrated in FIG. 9 to execute the interrupt process is reduced by about 15% (240000÷280000=0.857). FIGS. 14A and 14B are sequence diagrams illustrating a state where the time taken for the CPU 15 to execute the interrupt process is reduced by approximately 15%.

A third embodiment is different from the first and second embodiments in terms of taking not the scheme of setting some threshold values in the communication adaptor 11 but a scheme that the software controls interrupt permission and interrupt inhibition with respect to the communication adaptor 11. The hardware configuration and the software configuration other than this different point in the third embodiment are the same as in the first and second embodiments.

FIG. 15 is a diagram of a configuration of the communication adaptor 11 in the third embodiment.

The third embodiment does not involve using the register of the interrupt control unit 113 of the communication adaptor 11. Further, in the third embodiment, the PCI interface control unit 112 of the communication adaptor 11 includes a register 112a recorded with the interrupt factor and a register 112b recorded with an interrupt permitting or inhibiting instruction. The interrupt control unit 113, if the interrupt inhibiting instruction is recorded in the register 112b, does not notify the CPU 15 of the interrupt.

Note that the interrupt control unit 113, if only one event becoming the interrupt factor occurs till the next notification is made after the interrupt notification has been made, as illustrated in the sequence diagram of FIG. 4, notifies the communication adaptor driver 14c of one interrupt factor (e.g., one factor which triggers the process A in FIG. 4) in the interrupt notification made once. On the other hand, if two or more events each becoming the interrupt factor occurs for the period till the next notification is done since the interrupt notification was executed, the interrupt control unit 113 notifies, as illustrated in the sequence diagram in FIG. 5, the communication adaptor driver 14c, which will be explained later on, of plural interrupt factors (e.g., three factors which trigger the processes A through C in FIG. 5) in the interrupt notification given once.

Figure 16:
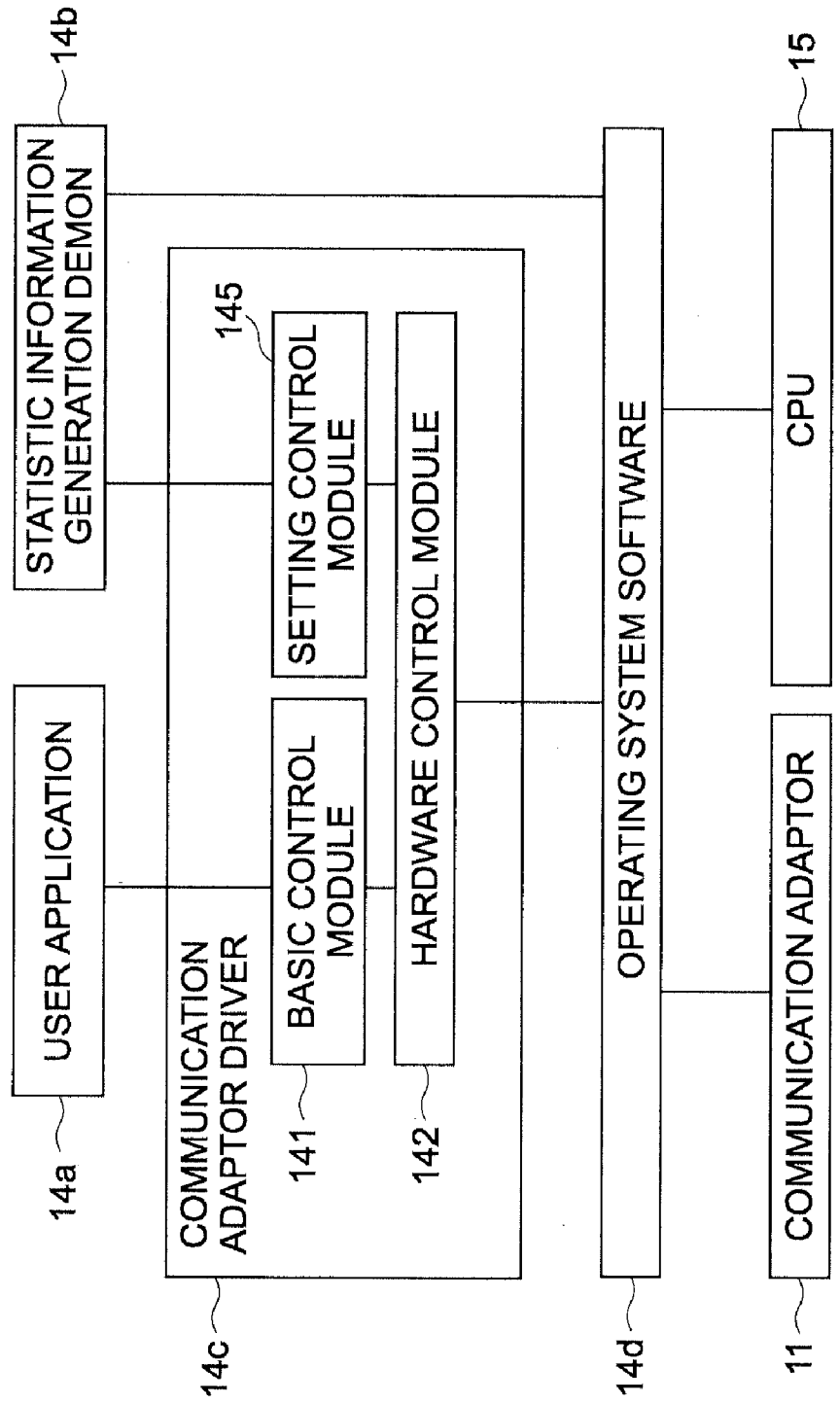
FIG. 16 is a diagram of a software configuration of the computer in the third embodiment.

FIG. 16 is a diagram of a software configuration of the computer 10 in the third embodiment.

The communication adaptor driver 14c in the third embodiment includes a setting control module 145. The setting control module 145 executes a process slightly different from the processes by the setting control modules 143, 144 (FIG. 6, FIG. 13) in the first and second embodiments.

After switching on the main power source of the computer 10, the CPU 15 reads the setting control module 145, thereby starting the setting control process.

Figure 17:
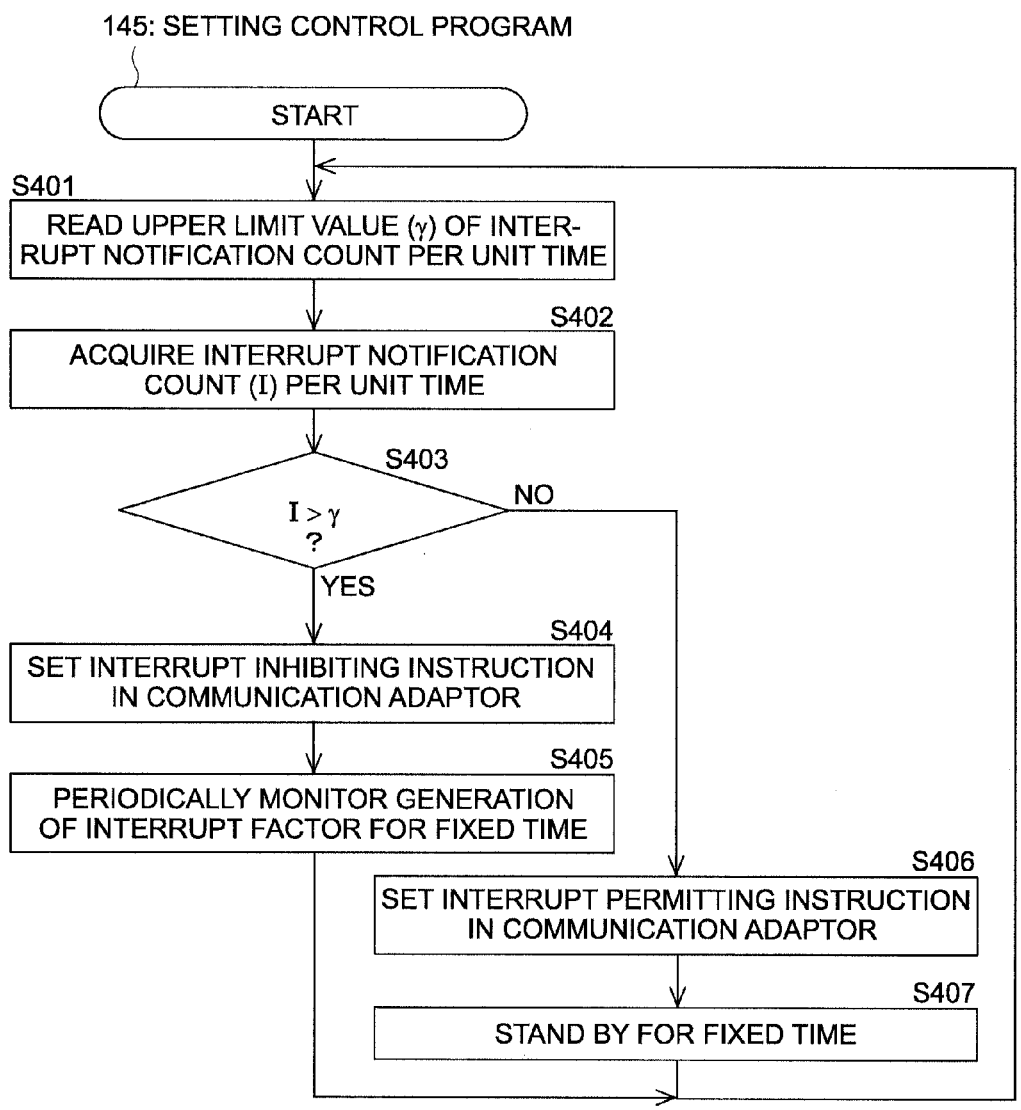
FIG. 17 is a flowchart illustrating a flow of the setting control process in the third embodiment.

FIG. 17 is a flowchart illustrating a flow of the setting control process in the third embodiment.

After starting the setting control process, in first step S401, the CPU 15 reads the upper limit value ($\gamma$ [count/sec]) of the interrupt notification count per unit time that is set in the communication adaptor driver 14c.

In next step S402, the CPU 15 acquires the interrupt notification count (I [count/sec]) per unit time of the corresponding communication adaptor 11 from the hardware control module 142. Note that the communication adaptor 11 is inhibited from interrupting in a processing step which will be described later on, in which case the interrupt notification count (I [count/sec]) per unit time is calculated based on the number of the interrupt factors acquired per unit time in step S405 that will be described later on.

In next step S403, the CPU 15 determines whether or not the interrupt notification count (I) per unit time that is acquired in step S402 exceeds the upper limit value ($\gamma$) read in step S401. Then, if the interrupt notification count (I) per unit time exceeds the upper limit value ($\gamma$), the CPU 15 advances the processing to step S404.

In step S404, the CPU 15 sets the interrupt inhibiting instruction in the communication adaptor 11. Note that the controller 11c of the communication adaptor 11 records the interrupt inhibiting instruction in the register 112b within the PCI interface control unit 112.

In next step S405, the CPU 15 executes a process of calculating (1/$\gamma$) that is an inverse number of the upper limit value ($\gamma$ [count/sec]) of the interrupt notification count per unit time that is read in step S401, and checking whether or not the interrupt factor is recorded in the register 112a within the PCI interface control unit 112 of the communication adaptor 11 at an interval of (1/$\gamma$) sec. Further, the CPU 15, as a result of checking, if the interrupt factor is recorded in the register 112a, executes also a process of invoking an interrupt handler within the basic control module 141 in the communication adaptor driver 14c. The CPU 15, after executing the process of monitoring how the interrupt factor described above is generated for the fixed period of time, loops the processing back to step S401.

While on the other hand, in step S403, if the interrupt notification count (I [count/sec]) per unit time acquired in step S402 is equal to or lower than the upper limit value ($\gamma$ [count/sec]) read in step S401, the CPU 15 diverts the processing to step S406 from step S403.

In step S406, the CPU 15 sets the interrupt permitting instruction in the communication adaptor 11. Note that the controller 11c of the communication adaptor 11 records the interrupt permitting instruction in the register 112b within the PCI interface control unit 112.

In step S407, the CPU 15 stands by for the fixed period of time and thereafter loops the processing back to step S401.

According to the setting control process described above, if the interrupt notification count (I) per unit time of the corresponding communication adaptor 11 exceeds the upper limit value ($\gamma$) set in the statistic information generation process, it follows that the interrupt notification by the communication adaptor 11 is restricted.

In the third embodiment also, similarly to the first and second embodiments, the statistic information generation demon 14b periodically sets the upper limit value ($\gamma$) of the interrupt notification count per unit time in the corresponding communication adaptor driver 14c on the basis of the upper limit value ($\delta$) of the system load of the corresponding communication adaptor 11, the actually-measured system load ($\alpha$) and the interrupt notification count ($\beta$) per unit time (steps S101-S106 in FIG. 7).

Further, the setting control module 144 executed in parallel with this statistic information generation demon 14b periodically determines whether or not the interrupt notification count (I) per unit time actually measured with respect to the corresponding communication adaptor 11 exceeds the upper limit value ($\gamma$) (steps S401-S403), and, if the interrupt notification count (I) per unit time exceeds the upper limit value ($\gamma$), restricts the interrupt of the communication adaptor 11 (step S403; Yes, S404).

For example, as stated above, the CPU 15 having the number "1" illustrated in FIG. 9 receives the interrupt notifications counted 20000 per unit time ($\alpha$=20000) and is 60% in its system load (usage ratio) ($\beta$=60), in which case the upper limit value of the system load of the CPU 15 is set to 30% ($\delta$=30), and the upper limit value ($\gamma$) of the interrupt notification count per unit time is estimated 10000 [count/sec] (step S104. Then, I=20000>$\gamma$, so that the interrupt inhibiting instruction is set in the communication adaptor 11 (step S404), and the generation of the interrupt factor is checked at an interval of (1/$\gamma$) sec (step S405).

Figure 18:
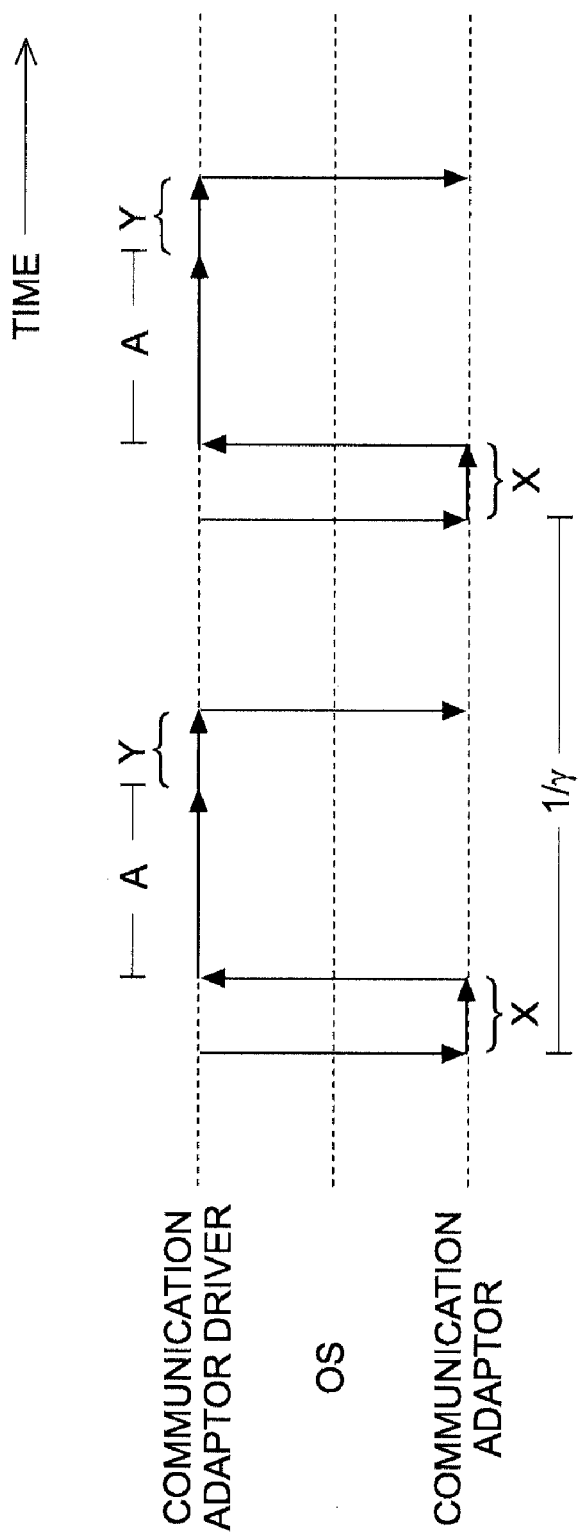
FIG. 18 is a sequence diagram in a case where setting control module acquires the interrupt factor.

Then, as illustrated in FIG. 18, it is assumed that the time required for the setting control module 144 of the communication adaptor driver 14c to execute the process (the process X in FIG. 18) of acquiring the interrupt factor is on the order of 2 µsec, the average time required for the basic control module 141 of the communication adaptor driver 14c to execute the process for one interrupt factor is on the order of 10 µsec, and the time taken for executing the subsequent stage process (the process Y in FIG. 18) after the communication adaptor driver 14c has executed the process corresponding to the interrupt factor is on the order of 2 µsec.

Then, supposing that one interrupt factor is transferred to the communication adaptor driver 14c through the one interrupt notification, the CPU 15 having the number "1" illustrated in FIG. 9 receives the interrupt notifications counted 20000 per unit time, and hence the time taken for the interrupt process is given such as 20000×(2+10+2)=280000 µsec. Note that the processing time of the CPU 15 per interrupt notification is given by 280000÷20000=14 µsec.

On the other hand, in the third embodiment, if the communication adaptor 11 is inhibited from interrupting and if an interrupt factor acquiring interval of the communication adaptor driver 14c is set such as (1/$\gamma$)=(1/10000) sec, the interrupt notification interval substantially increases twice, and it therefore follows that the two interrupt factors on the average are transferred to the communication adaptor driver 14c through the one interrupt notification. Accordingly, the time taken for the CPU 15 having the number "1" illustrated in FIG. 9 to execute the interrupt process is given by 20000×10+10000×(2+2)=240000 µsec. Note that the processing time of the CPU 15 per interrupt notification is given by 240000÷10000=24 µsec.

Figure 19A:
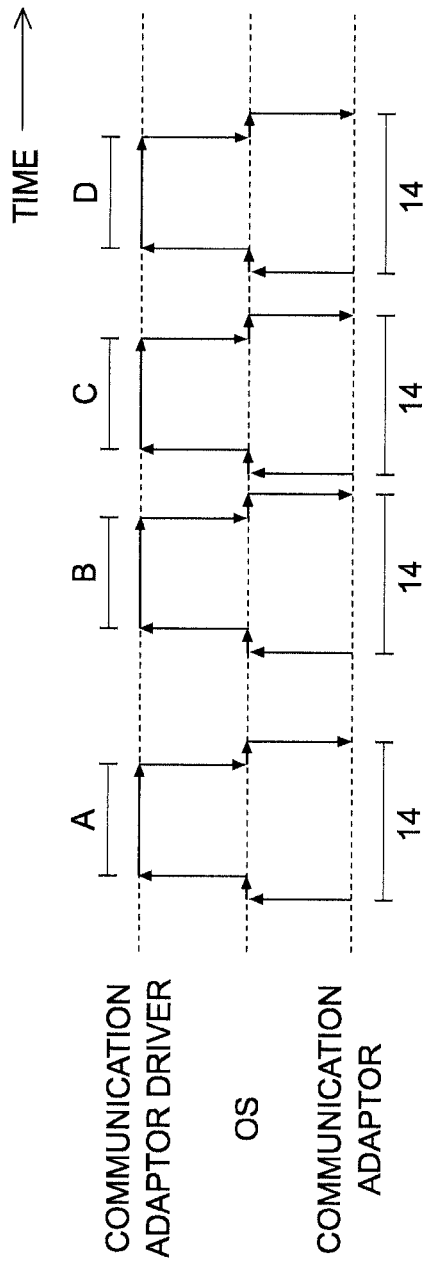
FIGS. 19A and 19B are sequence diagrams illustrating the state where the time taken for the CPU to execute the interrupt is reduced by about 15%.
Figure 19B:
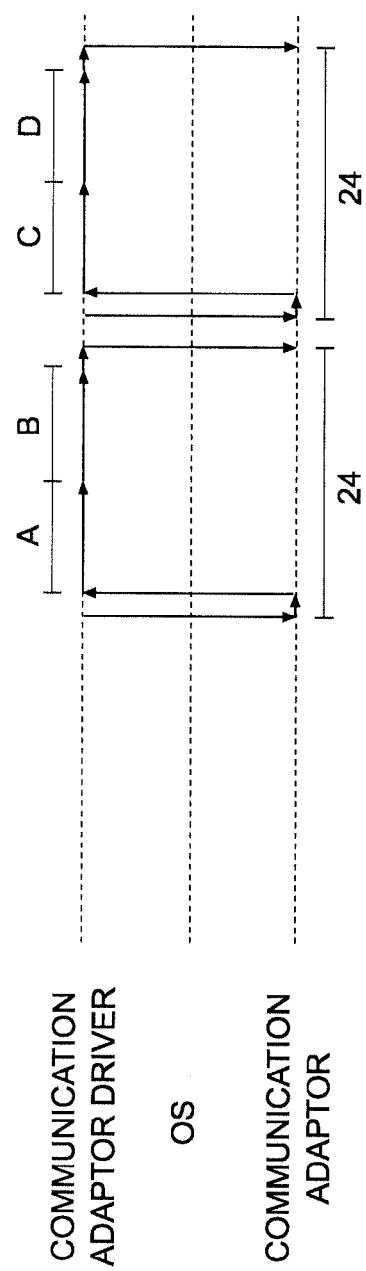

Accordingly, in the third embodiment also, the time taken for the CPU 15 having the number "1" illustrated in FIG. 9 to execute the interrupt process is reduced by about 15% (240000÷280000=0.857). FIGS. 19A and 19B are sequence diagrams illustrating a state where the time taken for the CPU 15 to execute the interrupt process is reduced by approximately 15%.

<Explanation about Unit>

In the first through third embodiments discussed above, the respective units 111-113 in the controller 11c may each be constructed of a software component and a hardware component and may also be constructed of only the hardware component.

The software component can be exemplified by an interface program, a driver program, a table, and data and by a combination of some of these components. These components may be stored on a computer-readable medium that will be explained later on and may also be firmware that is fixedly incorporated into a storage device such as a ROM [Read Only Memory] and an LSI [Large Scale Integration].

Moreover, the hardware component can be exemplified by an FPGA [Field Programmable Gate Array], an ASIC [Application Specific Integrated Circuit], a gate array, a combination of logic gates, a signal processing circuit, an analog circuit, and other types of circuits. Among these components, the logic gate may include an AND, an OR, a NOT, a NAND, a flip-flop, a counter circuit, and so on. Moreover, the signal processing circuit may include circuit elements which execute addition, multiplication, subtraction, inversion, a sum-of-products operation, differentiation, and integration of signal values. Further, the analog circuit may include circuit elements which execute amplification, addition, multiplication, differentiation, integration, etc.

Note that the components building up the units 111-113 in the controller 11c are not limited to those exemplified above but may be other components equivalent thereto.

<Explanation about Software and Program>

In the first through third embodiments discussed above, the pieces of software 14a-14d in the main body 10c of the computer 10, and the software components described above, may each include elements such as a software component, a procedure-oriented language based component, an object-oriented software component, class software, a component managed as a task, a component managed as a process, as a function, an attribute, a procedure, a subroutine (software routine), a fragment or segment of a program code, a driver, firmware, a microcode, a code, a code segment, an extra segment, a stack segment, a program area, a data area, data, a database, a data structure, a field, a record, a table, a matrix table, an array, a variable, and a parameter.

Further, the pieces of software 14a-14d in the main body 10c of the computer 10, and the software components described above, may each be described in a C-language, C++, Java (trademark of Sun Microsystems in U.S.A.), Visualbasic (trademark of Microsoft Corp. in U.S.A.), Perl, Ruby, and other programming languages.

Moreover, the instruction, the code, and the data contained in the pieces of software 14a-14d in the main body 10c of the computer 10, and the software components described above, may be transmitted to or loaded into a computer or a computer embedded into a machine or a system via a wired network card and a wired network or via a wireless card and a wireless network.

In the transmission or loading described above, the data signals flow via the wired network or the wireless network in the way of their being carried on, e.g., carrier waves (subcarriers). The data signals may also be, however, transferred intact as so-called baseband signals without depending on the carrier waves described above. These carrier waves are transmitted in an electric, magnetic, or electromagnetic mode, an optical mode, an acoustic mode, or other modes.

Herein, the wired network or the wireless network is a network built up by, e.g., a telephone line, a network line, a cable (including an optical cable and a metallic cable), a wireless link, a mobile phone access line, a PHS [Personal Handyphone System] network, a wireless LAN [Local Area Network], Bluetooth (trademark of the Bluetooth Special Interest Group), on-vehicle wireless type communications (including DSRC [Dedicated Short Range Communication]), and a network constructed of any one of those given above. Then, the data signals are used for transmitting the information including the instruction, the code, and the data to a node or the component on the network.

Note that the components configuring the pieces of software 14a-14d in the main body 10c of the computer 10, and the software components described above, are not limited those exemplified above and may also be other components equivalent thereto.

<Explanation about Computer-Readable Medium>

Any one of the functions in the first through third embodiments discussed above may be coded and thus stored in a storage area on the computer-readable medium. In this case, the program for utilizing the function can be provided to the computer or the computer embedded into the machine or the system via the computer-readable medium. The computer or the computer embedded into the machine or the system reads the program from the storage area on the computer-readable medium and executes the program, thereby enabling the function thereof to be utilized.

Herein, the computer-readable medium connotes a recording medium capable of accumulating information such as the program and the data by electrical, magnetic, optical, chemical, physical, or mechanical action, and retaining the information in a readable-by-computer status.

The electrical or magnetic action can be exemplified by writing the data to the element on the ROM [Read Only Memory] constructed by use of a fuse. The magnetic or physical action can be exemplified by a phenomenon of toners to form a latent image on a paper medium. Note that the information recorded on the paper medium can be read, e.g., optically. The optical and chemical action can be exemplified by forming a thin film or a rugged portion on a substrate. Incidentally, the information recorded in the ruggedness-utilized mode can be read, e.g., optically. The chemical action can be exemplified by oxidation-reduction reaction on the substrate, forming an oxide film or a nitride film on a semiconductor substrate, or a photo-resist phenomenon. The physical or mechanical action can be exemplified by forming a rugged portion on an emboss card or forming a punch-hole in the paper medium.

Moreover, in the computer-readable mediums, some mediums can be detachably attached to the computer or the computer embedded into the machine or the system. The attachable/detachable computer-readable medium can be exemplified by a DVD (including DVD-R, DVD-RW, DVD-ROM, DVD-RAM), a +R/+RW, a BD (including BD-R, BD-RE, BD-ROM), a CD [Compact Disk] (including CD-R, CD-RW, CD-ROM), an MO [Magneto Optical] disk, other optical disk mediums, a flexible disk (including a floppy disk (Floppy is a trademark of Hitachi Ltd.)), other magnetic disk mediums, a memory card (CompactFlash (trademark of SanDisk Corp. in U.S.A.), SmartMedia (trademark of Toshiba Co., Ltd.), SD card (trademark of SanDisk Corp. in U.S.A., Matsushita Electric Industrial Co., Ltd., and Toshiba Co., Ltd.), Memory Stick (trademark of Sony Corp.), MMC (trademark of Siemens in U.S.A. and SanDisk Corp. in U.S.A.) etc), a magnetic tape, and other tape mediums, and a storage device including, as a built-in component, any one of those mediums. Some of the storage devices have a built-in DRAM [Dynamic Random Access Memory] or SRAM [Dynamic Random Access Memory].

Furthermore, some of the computer-readable mediums are fixedly installed in the computer or the computer embedded into the machine or the system. This type of computer-readable medium can be exemplified by a hard disk, a DRAM, an SRAM, a ROM, an EEPROM [Electronically Erasable and Programmable Read Only Memory], and a flash memory.

All examples and conditional languages recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus comprising:
 a communication adaptor that generates an interrupt and holds definition information defining an allowable minimum amount of time between each interrupt;
 a processor configured to execute an operation, the operation including:
  determining a maximum value of number of interrupts per unit time based on a system load due to operation of the communication adaptor, and setting to the communication adaptor the definition information defining the allowable minimum amount of time each time corresponding to the determined maximum value of number of interrupts per unit time;
  counting a number of interrupts, which is received from the communication adaptor, per unit time;
  changing the definition information held in the communication adaptor so that the allowable minimum amount of time between each interrupt, defined by the definition information, into zero when counted number of interrupts per unit time becomes lower than a predetermined value; and
  processing each interrupt received from the communication adaptor.

2. An interrupt control device capable of connecting to a communication adaptor that generates an interrupt and holds definition information defining an allowable minimum amount of time between each interrupt, the interrupt control device comprising:
- a processor configured to execute an operation, the operation including:
  - determining a maximum value of number of interrupts per unit time based on a system load due to operation of the communication adaptor, and setting to the communication adaptor the definition information defining the allowable minimum amount of time each interrupt corresponding to the determined maximum value of number of interrupts per unit time;
  - counting a number of interrupts, which is received from the communication adaptor connected to the interrupt apparatus, per unit time;
  - changing the definition information held in the communication adaptor so that the allowable minimum amount of time between each interrupt, defined by the definition information, into zero when counted number of interrupts per unit time becomes lower than a predetermined value; and
  - processing each interrupt received from the communication adaptor.

3. An interrupt control method for a communication adaptor that generates an interrupt and holds definition information defining an allowable minimum amount of time between each interrupt, the method comprising:
- determining a maximum value of number of interrupts per unit time based on a system load due to operation of the communication adaptor, and setting to the communication adaptor the definition information defining the allowable minimum amount of time between each interrupt corresponding to the determined maximum value of number of interrupts per unit time;
- counting a number of interrupts, which is received from the communication adaptor, per unit time;
- changing the definition information of the communication adaptor so that the allowable minimum amount of time between each interrupt, defined by the definition information, into zero when counted number of interrupts per unit time becomes lower than a predetermined value; and
- processing each interrupt received from the communication adaptor.

* * * * *